(12) United States Patent
Freeman et al.

(10) Patent No.: US 11,431,700 B2
(45) Date of Patent: *Aug. 30, 2022

(54) SYSTEMS AND METHODS FOR AUTHENTICATING OR IDENTIFYING PERSONNEL AND PERSONNEL RELATED MATERIAL

(71) Applicant: Verinetics, Inc., Research Triangle Park, NC (US)

(72) Inventors: Darrell Jerome Freeman, Research Triangle Park, NC (US); Thomas J. Mercolino, Chapel Hill, NC (US); Hersh Ashok Tapadia, Research Triangle Park, NC (US)

(73) Assignee: Verinetics, Inc., Research Triangle Park, NC (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/890,854

(22) Filed: Jun. 2, 2020

(65) Prior Publication Data

US 2020/0329024 A1    Oct. 15, 2020

Related U.S. Application Data

(63) Continuation of application No. 16/055,463, filed on Aug. 6, 2018, now Pat. No. 10,673,842, which is a
(Continued)

(51) Int. Cl.
*H04L 9/40* (2022.01)
*G06Q 10/08* (2012.01)
(Continued)

(52) U.S. Cl.
CPC .......... *H04L 63/083* (2013.01); *G06K 9/6215* (2013.01); *G06Q 10/08* (2013.01);
(Continued)

(58) Field of Classification Search
None
See application file for complete search history.

(56) References Cited

U.S. PATENT DOCUMENTS

| 8,447,463 B1 * | 5/2013 | Chowdhary ......... G06Q 10/087 701/32.3 |
| 9,053,364 B2 | 6/2015 | Mercolino et al. |

(Continued)

OTHER PUBLICATIONS

USPTO; Non-Final Office Action for U.S. Appl. No. 14/936,587 dated Sep. 29, 2017.
(Continued)

*Primary Examiner* — Kaveh Abrishamkar
(74) *Attorney, Agent, or Firm* — NK Patent Law (57) ABSTRACT

A method is provided. The method includes providing an authentication code onto a reference article associated with a person, determining a signature associated with the authentication code, imaging a candidate article to determine an image signature, and comparing the associated signature with the image signature to determine whether the candidate article is the reference article. A related system and imaging device are also provided.

30 Claims, 5 Drawing Sheets

Related U.S. Application Data continuation of application No. 14/936,587, filed on Nov. 9, 2015, now Pat. No. 10,044,704.

(60) Provisional application No. 62/077,155, filed on Nov. 7, 2014.

(51) Int. Cl.
  *G06K 9/62* (2022.01)
  *G06V 10/44* (2022.01)
  *G06V 10/75* (2022.01)
  *G06V 20/52* (2022.01)
  *G06V 30/224* (2022.01)

(52) U.S. Cl.
  CPC ............ *G06V 10/44* (2022.01); *G06V 10/751* (2022.01); *G06V 20/52* (2022.01); *G06V 30/2247* (2022.01); *H04L 63/10* (2013.01)

(56) References Cited

U.S. PATENT DOCUMENTS

| | | | | |
|---|---|---|---|---|
| 9,208,293 | B1* | 12/2015 | Zhu | H04W 4/029 |
| 10,044,704 | B1* | 8/2018 | Freeman | G06K 9/4604 |
| 10,673,842 | B2* | 6/2020 | Freeman | G06K 9/6202 |
| 2008/0169903 | A1* | 7/2008 | Fein | G10L 17/00 340/5.84 |
| 2012/0286933 | A1* | 11/2012 | Hsiao | G06Q 10/0833 340/8.1 |
| 2014/0125457 | A1* | 5/2014 | Rushing | G06Q 10/0833 340/5.85 |
| 2015/0123767 | A1* | 5/2015 | Tolle | H04W 12/33 340/5.85 |

OTHER PUBLICATIONS

USPTO; Non-Final Office Action for U.S. Appl. No. 16/055,463 dated Oct. 30, 2019.

* cited by examiner

Basis Set ⌞ ⌝ ⌟

Reference Article ⌞ ⌝
⌞ ⌟

Candidate Article ⌝ ⌞
⌞ ⌟

Compare each location in the candidate to each shape in the basis set. This produces a set of numbers from the correlation between the location and each target shape.

[1,.1,.2,-.2]

[.1,-.1,0,.9]

[1,-.1,0,1]

[0,.1,-.1,.2]

[0,.1,.9,-.1]

[1,.9,-.2,.1]

The signature is a set of numbers for each location in the article:

Reference
[1,.1,.2,-.1]
[.1,-.1,0,.9]
[1,-.1,0,1]
[0,.1,-.1,.2]
[0,.1,.9,-.1]
[1,.9,-.2,.1]

Candidate
[1,.1,.2,-.1]
[.1,-.1,0,.9]
[0,-.1,0,1]
[0,.1,-.1,.2]
[0,.1,.9,-.1]
[1,.9,-.2,.1]

can compare the two signatures by evaluating the averagemean square difference

[1,.1,.2,-.1]   [1,.1,.2,-.1]
[.1,-.1,0,.9]   [.1,-.1,0,.9]
[1,-.1,0,1]     [0,-.1,0,1]
[0,.1,-.1,.2]   [0,.1,-.1,.2]
[0,.1,.9,-.1]   [0,.1,.9,-.1]
[1,.9,-.2,.1]   [1,.9,-.2,.1]

For example, the comparision of a shape could be calculated as follows:

[1,-.1,2,-.1] x [1,.1,3,-1]
(1-1)^2 + (-.1 - .1)^2 + (2 - .3)^2 + (-.1 - -.1)^2

0 + .04 + .01 + .04 = .09

The results for each location are averaged across the number of locations:

(.09 + .01 + .12 + .4 + .02 + .03)/6 = .1116...

This value is the similarity score between the two signatures.

FIG. 5

SYSTEMS AND METHODS FOR AUTHENTICATING OR IDENTIFYING PERSONNEL AND PERSONNEL RELATED MATERIAL

CROSS-REFERENCE TO RELATED APPLICATIONS

This application is a continuation of U.S. patent application Ser. No. 16/055,463, filed on Aug. 6, 2018, issuing as U.S. Pat. No. 10,673,842 on Jun. 2, 2020, which is a continuation of U.S. patent application Ser. No. 14/936,587, filed on Nov. 9, 2015, now U.S. Pat. No. 10,044,704 issued on Aug. 7, 2018, which claims priority to U.S. Provisional Patent Application No. 62/077,155, filed on Nov. 7, 2014, the entire contents of which are incorporated by reference herein.

BACKGROUND

Field of the Invention

The present invention relates to systems and methods for authenticating or identifying articles that may move in a theatre, and in particular personnel and personnel related material.

Description of Related Art

Valuable articles are counterfeited or fraudulently represented. Life-saving products are always high value, and regrettably, disproportionately targeted by the bad actors that commit these crimes.

As a well-known example, counterfeit and substandard antimalarial drugs were documented to have appeared in Africa shortly after their development, yet the media recently reported on how these fakes continue to undermine years of progress in treating and reducing the incidence of disease there. In the absence of proper planning and control, counterfeit and substandard personal protective equipment (PPE) similarly will thwart efforts to treat and stop the spread of Ebola virus.

Additionally, determining identification of articles that may move in a theatre is complex. Exemplary of such articles are persons in many scenarios where they are uniformed, making identification difficult. Examples of theatres include shipyards, warehouses, in military operations, and in health care settings.

There remains a need to address these disadvantages and others not described herein.

BRIEF SUMMARY

According to one embodiment, a method is provided. The method includes providing an authentication code onto a reference article associated with a person, determining a signature associated with the authentication code, imaging a candidate article to determine an image signature, and comparing the associated signature with the image signature to determine whether the candidate article is the reference article.

According to one or more embodiments, the article is a container, such as a shipping container in a shipyard or wrapper around a pallet in a warehouse.

According to one or more embodiments, the article is a garment worn by a person.

According to one or more embodiments, the article is multiple garments worn by a person or layered containers.

According to one or more embodiments, each of the multiple garments or layered containers have respective authentication codes.

According to one or more embodiments, the signature of each respective authentication code is stored in a database and associated with each other.

According to one or more embodiments, a system is provided that includes a server configured for receiving an authentication code associated with a person and determining a signature associated with the authentication code and an imaging device that images a candidate article and communicates the image to the server. The server compares the associated signature with the image signature to determine whether the candidate article is the reference article.

According to one or more embodiments, an imaging device having computer control code thereon that when executed by a processor images an authentication code on a candidate article, communicates the image to a server, and receives, from the server, an indication of authenticity between the signature of the candidate article and a signature of a reference article.

DETAILED DESCRIPTION

Figure 1:
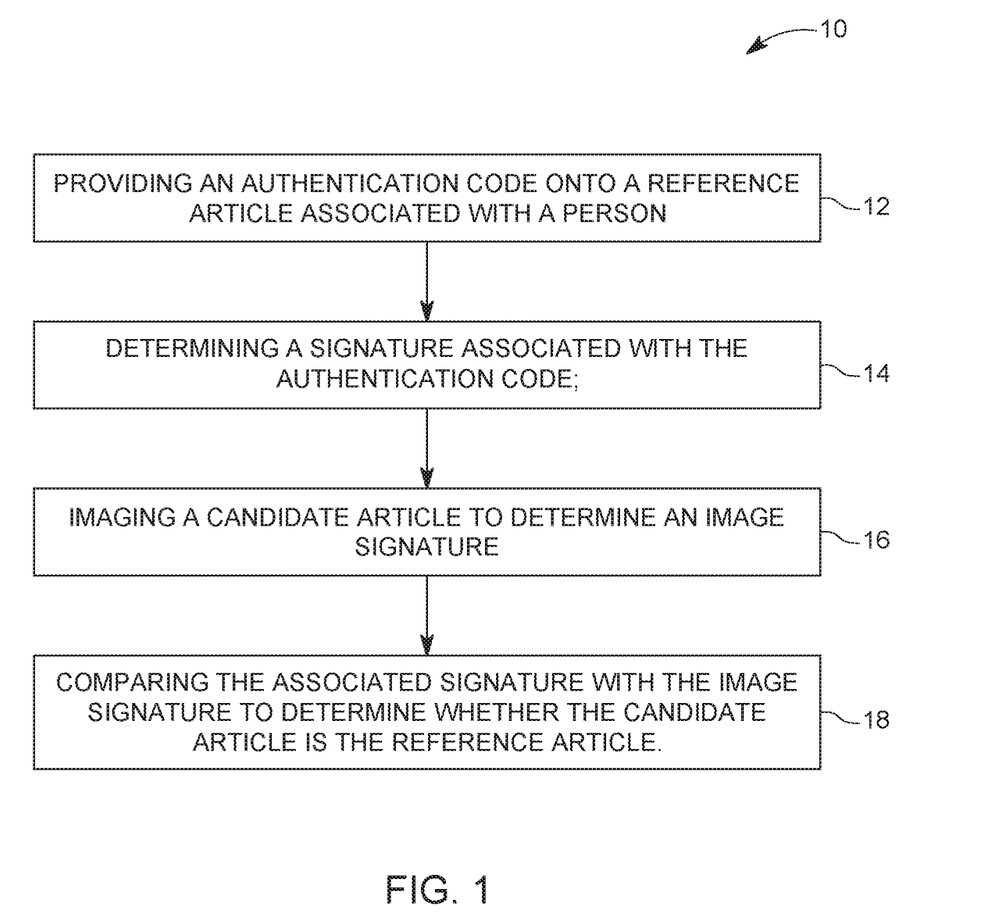
FIG. 1 illustrates a flow chart depicting one or more methods described herein. It is intended that the "person" described in figure one could be substituted with any item or person in a theatre in this and other figures described below.

With reference now to FIG. 1, a method 10 is illustrated. The method includes providing an authentication code 12 onto a reference article associated with a person.

The authentication code may be any appropriately configured code, including a random code of assigned variables. The code may be any of the codes illustrated in co-pending patent application Ser. No. 13/457,115 filed on Apr. 26, 2012 by the current assignee of this disclosure and application Ser. No. 14/067,945 filed on Oct. 30, 2013, the entire contents relating to the types of code, methods for imagining, methods for generating, and methods for creating a signature are incorporated by reference herein.

The one or more methods provide for authentication and identification (autoID) of an article from a digital image that may come from a simple mobile application on a smart phone or any other digital imaging device, including optical scanners, remote cameras, or video feed. Any smart printer may be used to deliver autoID codes, which do not require special inks or taggants, expensive validation hardware, or proprietary printers.

The reference article associated with a person may be a garment such as a uniform. The authentication code may be provided on the uniform as a code randomly positioned on the uniform or positioned at designated places on the uniform. The code may be produced in distinct or defined limited areas or may be produced to substantially cover the uniform. The code may be sewn on, printed on, painted on, or otherwise adhered or applied on. The garment may be a multi-piece garment. In an illustrative example of a PPE, there might be provided a suit covering the persons torso, arms, and legs, shoes to cover their feet, gloves to cover their hands, and a mask or helmet to cover their face. The same authentication code could be applied to each of the suit, shoes, gloves, and mask or helmet, or alternative or differing codes could be applied to each and the server and system disclosed herein could track the differing codes.

Figure 2:
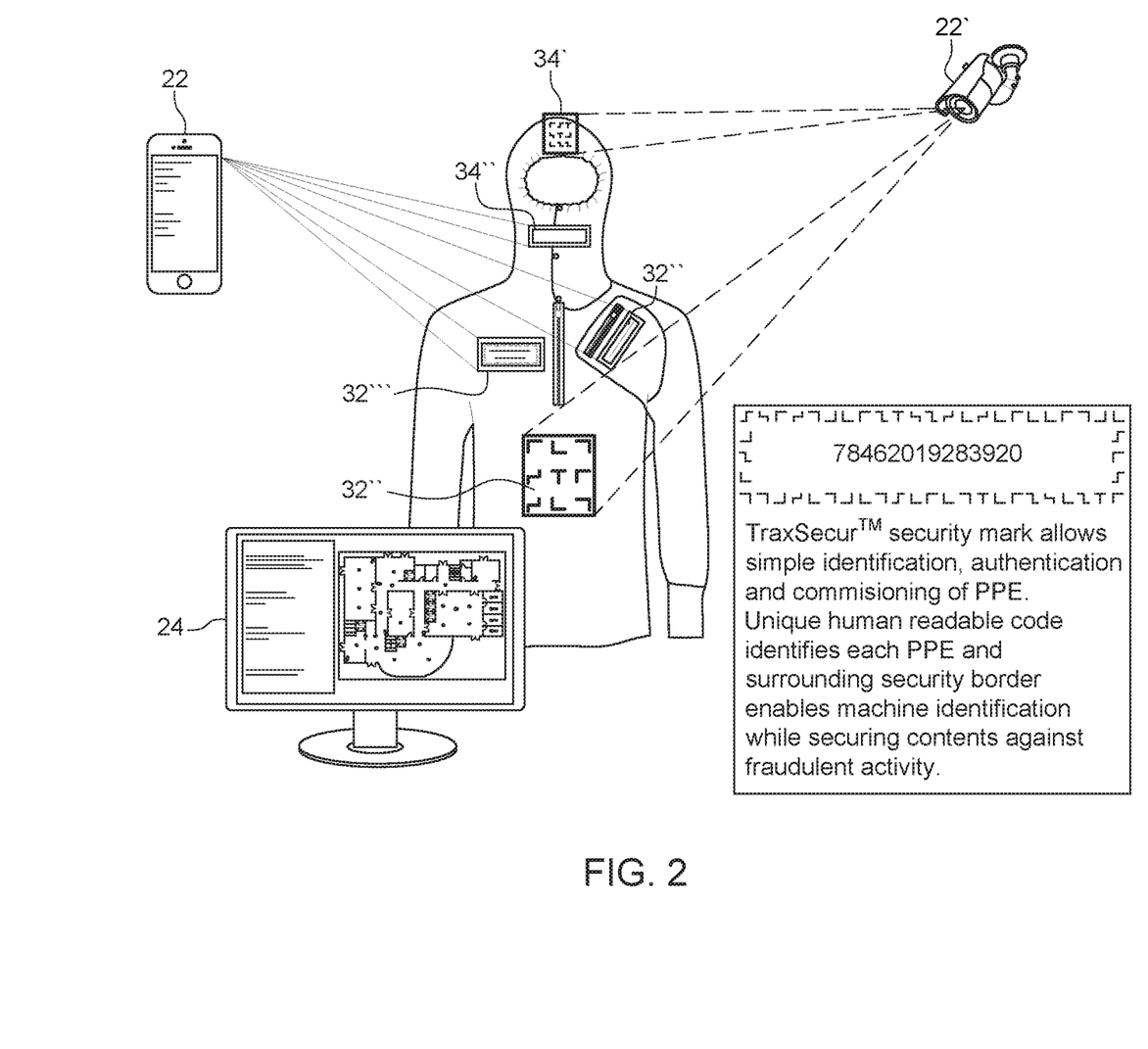
FIG. 2 illustrates a diagram of a plurality of imaging devices interacting with authentication code onto a reference article associated with a person.

The reference article associated with a container may be a shipping container 28B such as is used for moving freight by ship, train, or truck. Alternatively, the container may be the wrapping of a pallet 28A typically used to move multiple cartons or other items in a warehouse. The authentication code may be provided on the container as described for a uniform, above. The container may be layered, as where multiple pallets are enclosed in a shipping container, or where multiple boxes are wrapped on a pallet. The same authentication code could be applied to each layer, or alternative or differing codes could be applied to each and the server and system disclosed herein could track the differing codes. The container may be any enveloping material capable of concealing or otherwise masking the contents carried therein.

The method may include determining a signature 14 associated with the authentication code. This signature may be a numerical signature that is generated based on the code. Further description of one appropriate methodology is depicted and described with reference to FIG. 5.

The method may include imaging a candidate article 16 to determine an image signature of the candidate article. The imaging may be carried out by any appropriate imaging device including a mobile device having imaging capabilities, a scanner or similar camera, and the like. In one embodiment, an imaging device may be positioned proximal to a check-in or check-out location for medical equipment such as PPE. In these instances, a person may check out equipment by scanning the PPE a first time to determine the reference signature. Alternatively, the reference signature may be determined before the code is ever printed onto the article. In these embodiments, other identifying characteristics of the person checking out the equipment may be monitored, such as facial recognition, finger prints, and the like.

The reference signature and the person are thus linked with an appropriate database such as one maintained on the server. The scanning of the PPE may include scanning of each article of the PPE. In this manner, a person may have, as an example, a mask having a first authentication code and a suit having a second authentication code and the server can associate the mask and the suit together with a particular person even though the codes do not match.

An example of an article or garment such as PPE with authentication code provided thereon is illustrated in FIG. 2.

The method may then include comparing the associated reference signature with the candidate image signature to determine whether the candidate article is the reference article 18. This comparison may be accomplished on a server or may be accomplished on the imaging device or a device coupled to the imaging device.

As illustrated in FIG. 2, the imaging device may include multiple imaging devices 22. For example, in a surveillance setting, multiple imaging devices may be positioned within a floor plan, shipyard, or warehouse space. The imaging devices can thus track location of persons traveling from room to room or into secured or non-secured areas. The signature associated with the code may include information such as the person assigned to the article, the manufacture date of the article, permissions for the person to enter into a portion of a building or access information, and the like. The images may then be provided with reference to a known outline of an imaged area 24.

The first garment 26 may include a first authentication code 32', a second authentication code 34', and a third authentication code 36'. The codes may be the same, or different, and may be provided in layers with other information such as the name of the person wearing garment 26. Second garment 30 may include a first authentication code 34' and a second authentication doe 34". Codes 34 and 34" may be different from one another or may be the same but provide on separate portions of garment 30 in order to provide more presentation of the codes for imaging.

Figure 3:
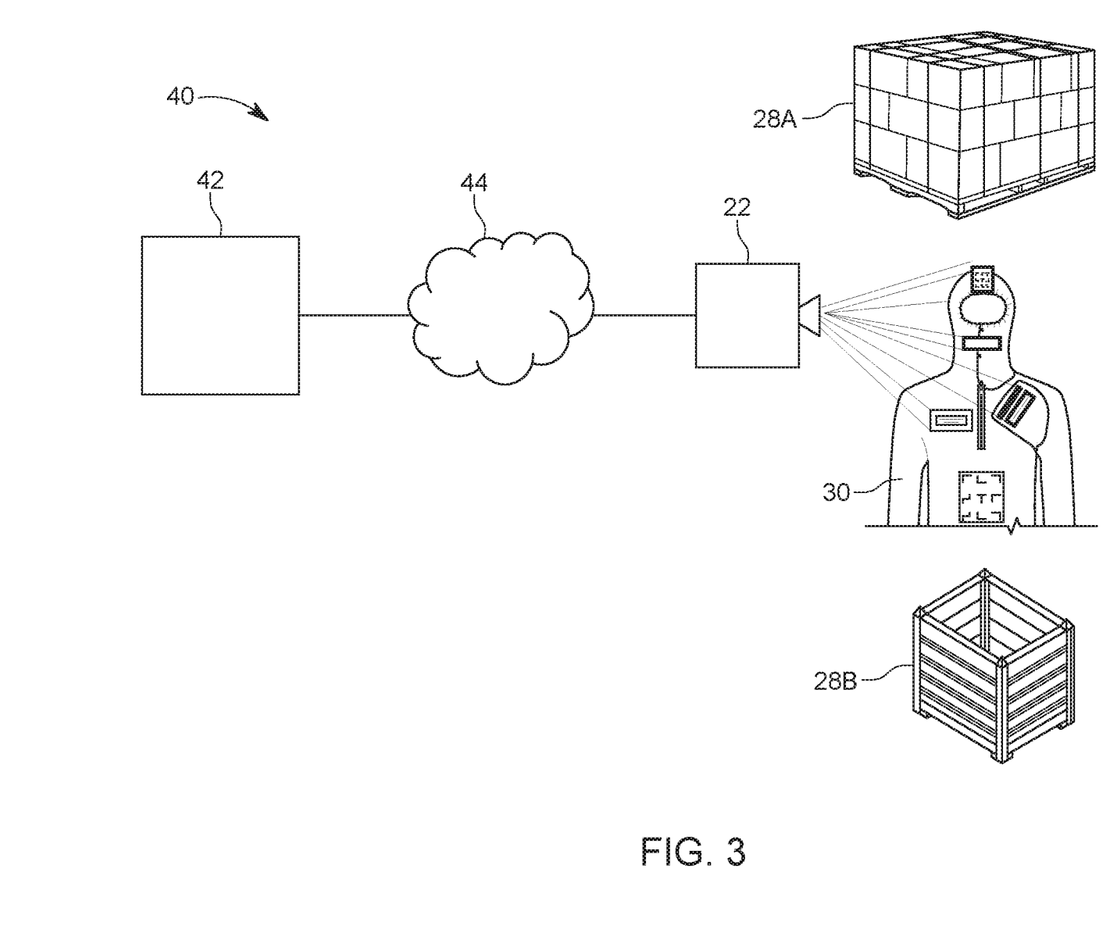
FIG. 3 illustrates a system diagram of a server, network, and imaging device where the imaging device is interacting with an authentication code on a reference article associated with a person.

A system is thus provided and illustrated in FIG. 3. The system 40 may include a server 42 configured for receiving an authentication code associated with a person or a garment of a person and determining a signature associated with the authentication code. The system 40 may further include the imaging device 22 that images a candidate article and communicates the image to the server. The server 42 is configured to compare the associated signature with the image signature to determine whether the candidate article is the reference article. The server may communicate with the imaging device over a network 44, which may be a WLAN, Cellular, Blue-Tooth, or other near or far range network.

The server 42 may include a processor and a memory. The server is configured for receiving an authentication code associated with a person and determining a signature associated with the authentication code, receiving an image having an authentication code from an imaging device, determining a signature associated with the authentication code of the received image, and comparing the signature associated with the authentication code of the received image with a reference signature to determine whether the candidate article is the reference article. In one or more embodiments, the signature associated with the reference authentication code may be pre-determined or provided in a downloadable database. In one or more embodiments, the garment is personal protective equipment having a pre-defined period of authorized use by the person. In one or more embodiments, the server is configured for receiving a subsequent image at a subsequent time from the imaging device. In one or more embodiments, the server is configured for displaying, on a user interface, a map outline of the received images with reference to a known outline of an imaged area. In one or more embodiments, the article(s) are multiple garments worn by a person. In one or more embodiments, each of the multiple garments have respective authentication codes. In one or more embodiments, the signature of each respective authentication code is stored in a database. In some embodiments, the reference article is a garment worn by a person or a container. In some embodiments, the authentication code of the multiple garments worn by the person or of multiple layers of the container are not the same, the server configured to match differing authentication codes corresponding with the multiple garments worn by the person or multiple layers of the container. In one or more embodiments, the server is configured for receiving a second image having an authentication code from a second imaging device.

Figure 4:
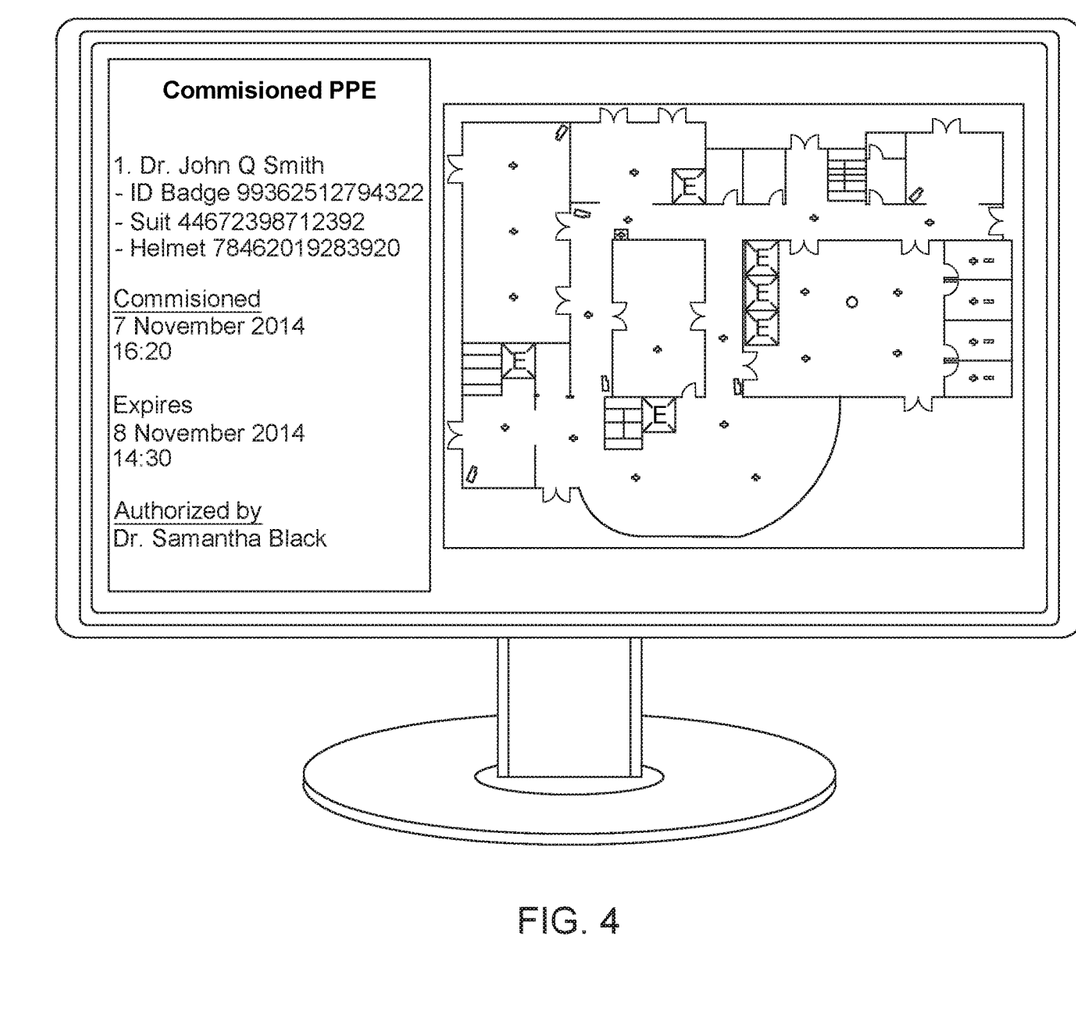
FIG. 4 illustrates information associated with a given person or reference article.

Relevant information associated with a person or article as illustrated in FIG. 2 is illustrated in FIG. 4, along with a floor plan for use in a surveillance setting. Captured images and signatures may be used to track movement of a person on the floor plan.

An imaging device having computer control code thereon that when executed by a processor is thus provided. The computer control code is configured to image an authentication code on a candidate article, communicate the image to a server, and receive, from the server, an indication of authenticity between the signature of the candidate article and a signature of a reference article.

In these one or more methods and embodiments disclosed herein, advantageously there is provided methodologies for line-of-sight tracking of personnel or containers in a theater or other setting. This presents an advantage over certain radio-based or other frequency based technologies where such tracking is undesirable (such as effect on medical equipment or a way for the interrogator to be track which would thus be undesirable in a military setting) or where the signal noise from such crowded tracking would be undesirable.

Figure 5:
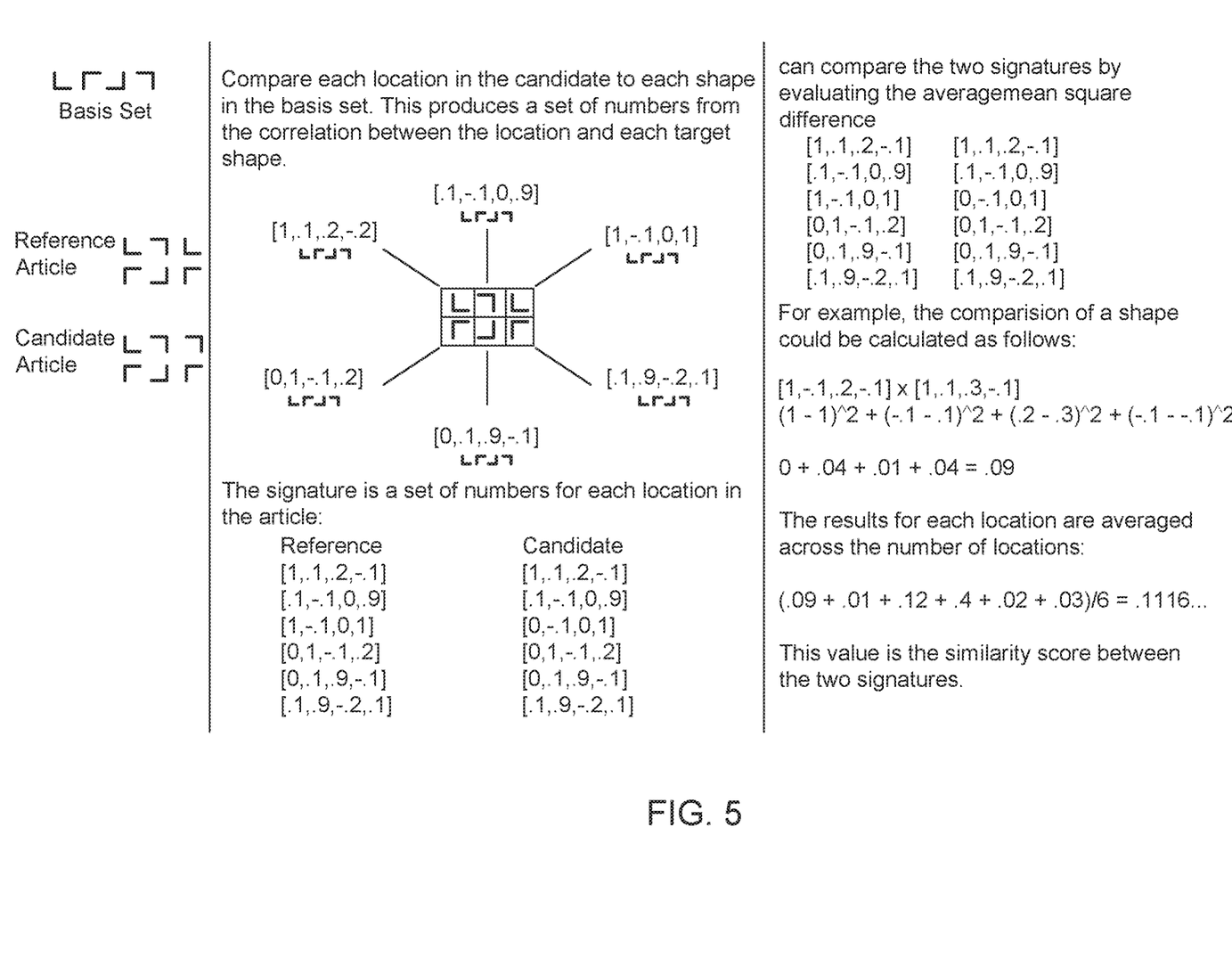
FIG. 5 illustrates one or more methods of determining a signature associated with an authentication code.

As illustrated in FIG. 5, the signature may be generated from processing a plurality of elements present on an article. These elements may be described using a set of source likenesses and given a numerical similarity score or a collection of numerical similarity scores. A similarity score or a set of similarity scores may be calculated by comparing a location in the article to a predefined shape or set of shapes. This comparison may be done by using an image representation of the location on the article and performing a correlation operation between the image representation and an image representation of the shape or set of shapes. This operation may produce a similarity score or set of similarity scores from the result of the correlation operation. The signature may contain the similarity score or the collection of scores. The collection of similarity scores can be stored and they can also be compared to determine similarity between two sets of such scored. These elements may be represented as a digital image and processed by a software code which calculates the aforementioned similarity scores. The software code may also compare two sets of scores to determine similarity between scores in the set or the sets as a whole.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An imaging device having computer control code thereon that when executed by a processor:
    images an authentication code on a candidate article; and
    determines an indication of authenticity between a signature of the candidate article authentication code and a signature of a reference article authentication code;
    wherein the candidate article signature and reference article signature each are generated by processing a plurality of elements present on the candidate article and reference article, respectively, and wherein the elements are described using a set of source likenesses and given a numerical similarity score or a collection of numerical similarity scores relative to said likenesses; and
    wherein said indication of authenticity is based upon the result of a correlation operation between candidate article signature and reference article signature.

2. The imaging device of claim 1, wherein the candidate article moves in a theatre of operation.

3. The imaging device of claim 1, wherein the candidate article is within a container, wherein the container is a box.

4. The imaging device of claim 1, wherein the candidate article is within a container, wherein the container is a shipping container.

5. The imaging device of claim 1, wherein the candidate article is within a container, wherein the container is layered.

6. The imaging device of claim 1, wherein the image is communicated to a server or device coupled to the imaging device and wherein the corresponding indication of authenticity is received by the imaging device from said server or device coupled to the imaging device.

7. The imaging device of claim 1, wherein the signature of each respective authentication code is stored in a database.

8. The imaging device of claim 1, further configured to receive a subsequent image at a subsequent time from the imaging device.

9. The imaging device of claim 1, wherein the imaging device is selected from a smart phone, optical scanner, remote camera, or video feed.

10. The imaging device of claim 2, wherein the theatre of operation is selected from a shipyard, warehouse, military operations, or health care settings.

11. The imaging device of claim 1, wherein an identity of the candidate article is concealed or otherwise masked.

12. The imaging device of claim 11, wherein the candidate article and reference article are persons.

13. The imaging device of claim 12, wherein the person moves in a theatre of operation.

14. The imaging device of claim 11, wherein the information is identification information.

15. The imaging device of claim 11, wherein concealment or masking is by PPE.

16. The imaging device of claim 15, wherein the PPE is comprised of suit, shoes, gloves, mask or helmet.

17. The imaging device of claim 11, wherein the image is communicated to a server or device coupled to the imaging device and wherein the corresponding indication of authenticity is received by the imaging device from the server or the device coupled to the imaging device.

18. The imaging device of claim 11, wherein the signature of each respective authentication code is stored in a database.

19. The imaging device of claim 11, further configured to receive a subsequent image at a subsequent time from the imaging device.

20. The imaging device of claim 11, wherein the imaging device is selected from a smart phone, optical scanner, remote camera, or video feed.

21. A method comprising:
  imaging an authentication code on a candidate article using an imaging device executed by a processor, wherein the imaging device has computer control code thereon; and
  determining an indication of authenticity between a signature of the candidate article and a signature of a reference article; and
  retrieving information associated with the reference article based upon said determination;
  wherein the candidate article signature and reference article signature each are generated by processing a plurality of elements present on the candidate article and reference article, respectively, and wherein the elements are described using a set of source likenesses and given a numerical similarity score or a collection of numerical similarity scores relative to said likenesses; and
  wherein said indication of authenticity is based upon the result of a correlation operation between candidate article signature and reference article signature.

22. The method of claim 21, wherein an identity of the candidate article is concealed or otherwise masked, and wherein the candidate article and reference article are persons.

23. The method of claim 21, wherein the information is identification information.

24. The method of claim 21, wherein concealment or masking is by PPE.

25. The method of claim 24, wherein the PPE is comprised of suit, shoes, gloves, mask or helmet.

26. The method of claim 21, wherein the image is communicated to a server or device coupled to wherein the corresponding indication of authenticity is received by imaging device from the server or the device coupled to the imaging device.

27. The method of claim 21, wherein the signature of each respective authentication code is stored in a database.

28. The method of claim 21, further configured to receive a subsequent image at a subsequent time.

29. The method of claim 21, wherein the method of is selected from a smart phone, optical scanner, remote camera, or video feed.

30. The method of claim 22, wherein the person moves in a theatre of operation.

* * * * *